United States Patent
Mittal et al.

(10) Patent No.: US 9,228,505 B2
(45) Date of Patent: Jan. 5, 2016

(54) FUEL INJECTOR WITH CO-AXIAL CONTROL VALVE MEMBERS AND FUEL SYSTEM USING SAME

(75) Inventors: Mayank Mittal, Peoria, IL (US); Adrienne M. Brasche, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 702 days.

(21) Appl. No.: 13/563,836

(22) Filed: Aug. 1, 2012

(65) Prior Publication Data

US 2014/0034019 A1 Feb. 6, 2014

(51) Int. Cl.
*F02D 19/06* (2006.01)
*F02D 19/10* (2006.01)

(52) U.S. Cl.
CPC ............ *F02D 19/06* (2013.01); *F02D 19/10* (2013.01); *Y02T 10/36* (2013.01)

(58) Field of Classification Search
CPC ........... F02B 2053/005; F02B 53/00; F02B 2075/125; F02B 3/06; F02D 41/0025; F02D 19/08; F02D 2041/389; F02D 37/02; F02D 41/0042; F02D 19/06; F02D 19/10; F02P 5/045; F02M 25/08; F02M 37/0064; F02M 13/08; F02M 21/02; Y02T 10/36
USPC ........................ 251/129.01–129.22
See application file for complete search history.

(56) References Cited

U.S. PATENT DOCUMENTS

| | | | |
|---|---|---|---|
| 2,555,029 A | 5/1946 | Fehling et al. | |
| 3,403,632 A | 10/1968 | Hulsing | |
| 4,499,862 A * | 2/1985 | Baumer et al. | 123/1 A |
| 4,550,744 A | 11/1985 | Igashira et al. | |
| 4,700,672 A * | 10/1987 | Baguena | 123/299 |
| 4,784,102 A | 11/1988 | Igashira et al. | |
| 6,422,199 B1 * | 7/2002 | Buckley et al. | 123/299 |
| 6,568,369 B1 * | 5/2003 | Desai et al. | 123/467 |
| 6,588,406 B2 | 7/2003 | Oprea | |
| 6,776,139 B1 * | 8/2004 | Spoolstra | 123/446 |
| 7,134,615 B2 | 11/2006 | Lawrence | |
| 7,234,650 B2 * | 6/2007 | Kuroyanagi et al. | 239/102.2 |
| 7,373,931 B2 * | 5/2008 | Lennox et al. | 123/525 |
| 7,556,017 B2 * | 7/2009 | Gibson | 123/299 |
| 7,891,579 B2 * | 2/2011 | Mashida et al. | 239/96 |
| 8,459,576 B2 * | 6/2013 | Kim et al. | 239/585.1 |
| 2004/0055562 A1 * | 3/2004 | Stewart et al. | 123/299 |
| 2004/0108394 A1 * | 6/2004 | Lawrence | F02M 45/086 239/533.2 |
| 2006/0284129 A1 * | 12/2006 | Krishnaswamy et al. | 251/129.15 |
| 2009/0277423 A1 * | 11/2009 | Cooke | F02M 45/086 123/494 |
| 2010/0174467 A1 * | 7/2010 | Ibrahim | 701/103 |

FOREIGN PATENT DOCUMENTS

JP 60259757 12/1985

* cited by examiner

*Primary Examiner* — Hung Q Nguyen
*Assistant Examiner* — Brian P Monahon

(57) ABSTRACT

A dual fuel injector utilizes first and second control valves to open and close first and second nozzle outlet sets to inject a first fuel and a second fuel, respectively. The first and second control valves have concentric lines of action. The two fuels may differ in at least one of chemical identity, matter phase and pressure.

20 Claims, 8 Drawing Sheets

FUEL INJECTOR WITH CO-AXIAL CONTROL VALVE MEMBERS AND FUEL SYSTEM USING SAME

TECHNICAL FIELD

The present disclosure relates generally to dual fuel injectors, and more particularly to two control valves with concentric lines of action.

BACKGROUND

There has been a growing trend in the engine industry to consider fueling engines with two fuels from a single fuel injector associated with each engine cylinder. The two fuels may differ from one another in at least one of chemical identity, matter phase and pressure. For instance, there has been increasing interest in powering compression ignition engines primarily with natural gas injected at a first pressure that is ignited from a compression ignited small pilot injection of liquid diesel fuel. However, in order to be viable, the fuel injector must generally have the ability to independently control both timing and quantity of the injection of the two different fuels. This in turn may require two separate electronically control valves housed within the single fuel injector. Finding a way to organize the plumbing, and arrange two independent electrical actuators and their associated control valves within a single fuel injector has proven to be difficult and problematic.

The present disclosure is directed to one or more of the problems set forth above.

SUMMARY

In one aspect, a fuel injector includes an injector body that defines a first fuel inlet, a second fuel inlet, a first nozzle outlet set, a second nozzle outlet set and a drain outlet. The injector body also has disposed therein a first control chamber and a second control chamber. A first check valve member has a closing hydraulic surface exposed to fluid pressure in the first control chamber, and is movable between a closed position in contact with a first seat to fluidly block the first fuel inlet to the first nozzle outlet set, and an open position out of contact with the first seat to fluidly connect the first fuel inlet to the first nozzle outlet set. A second check valve member has a closing hydraulic surface exposed to fluid pressure in the second control chamber, and is movable between a closed position in contact with a second seat to fluidly block the second fuel inlet to the second nozzle outlet set, and an open position out of contact with the second seat to fluidly connect the second fuel inlet to the second nozzle outlet set. A first control valve member is positioned in the injector body and is movable along a common centerline between a first position at which the first control chamber is fluidly blocked to the drain outlet, and a second position at which the first control chamber is fluidly connected to the drain outlet. A second control valve member is positioned in the injector body and movable along the common centerline between a first position at which the second control chamber is fluidly blocked to the drain outlet, and a second position at which the second control chamber is fluidly connected to the drain outlet.

In another aspect, a fuel system includes a plurality of the fuel injectors. A source of first fuel is fluidly connected to the first fuel inlet, and a source of second fuel is fluidly connected to the second fuel inlet. An electronic controller is in control communication with each of the plurality of fuel injectors. The first fuel differs from the second fuel in at least one of chemical identity, matter phase and pressure.

In still another aspect, a method of operating the fuel system with a plurality of the fuel injectors includes injecting a first fuel from the first nozzle outlet set by moving the first control valve member from a first position to a second position along a common centerline. A second fuel is injected from a second nozzle outlet set by moving a second control valve member from a first position to a second position along the common centerline.

DETAILED DESCRIPTION

Figure 1:
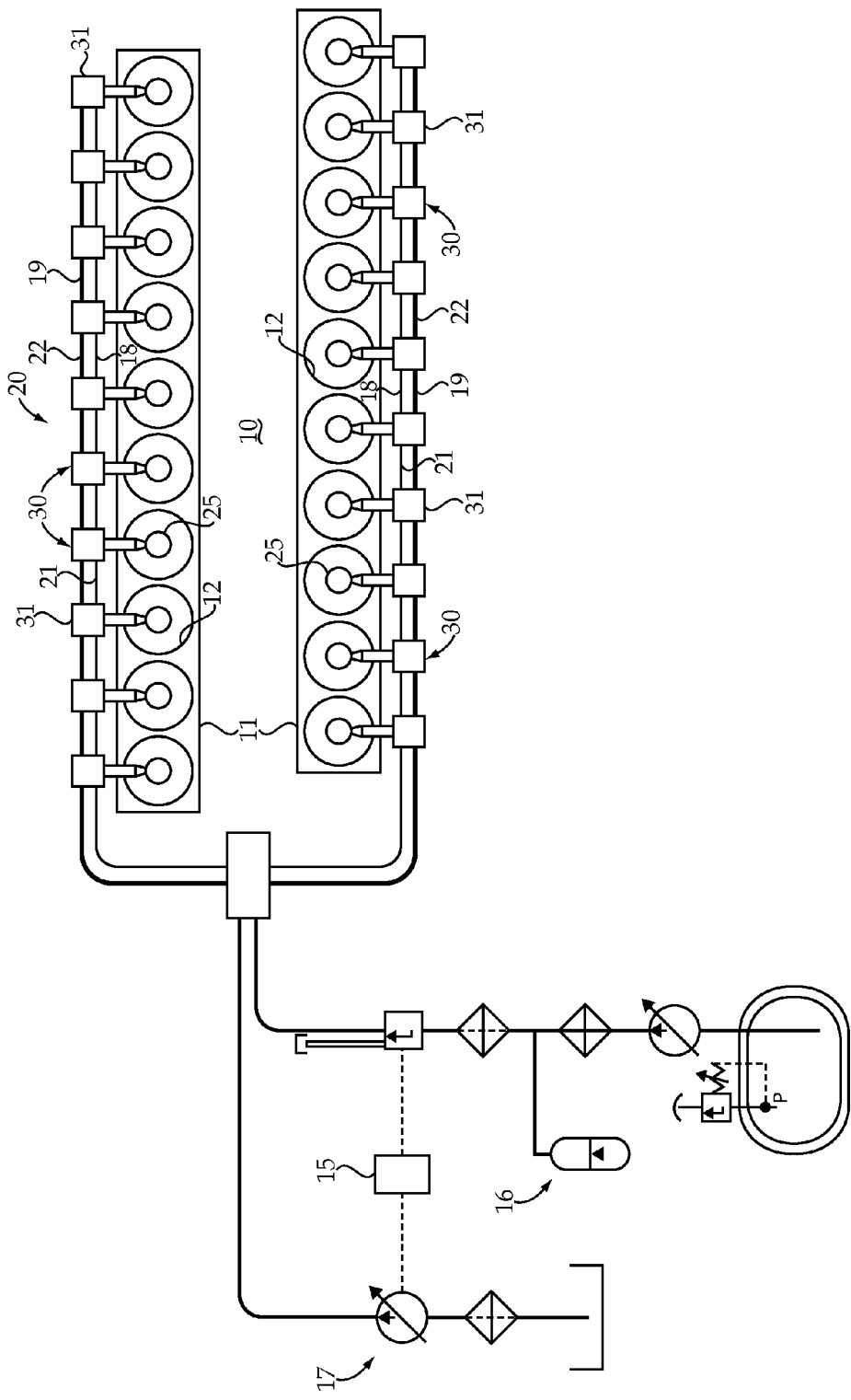
FIG. 1 is a schematic view of a dual fuel engine according to the present disclosure.
Figure 2:
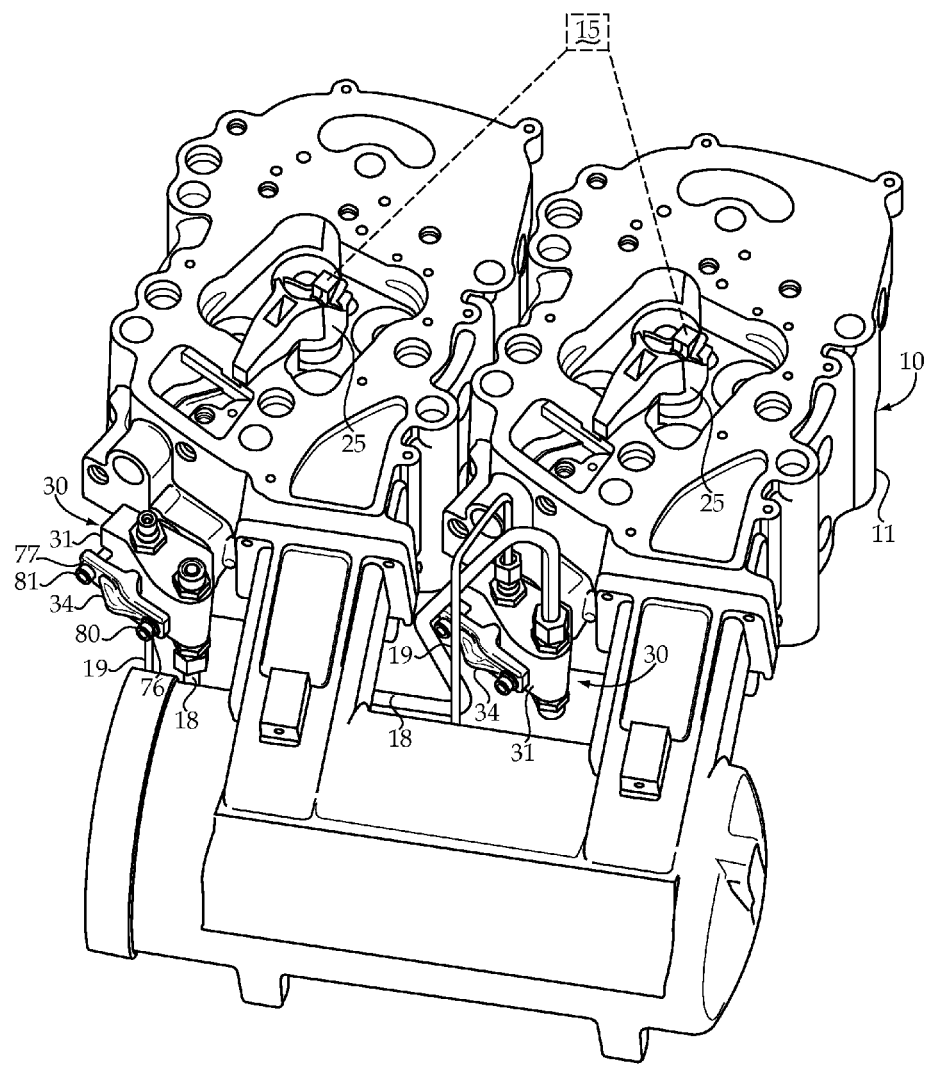
FIG. 2 is a perspective view of a portion of the engine and dual fuel common rail system for the engine of FIG. 1.
Figure 3:
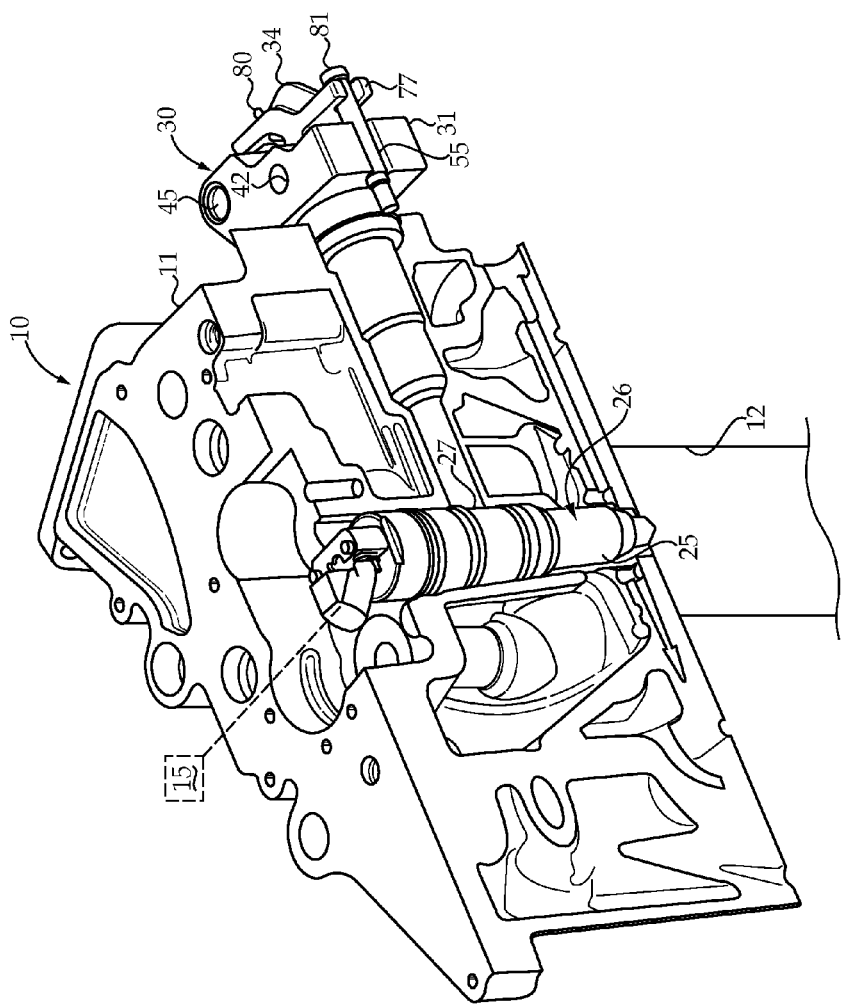
FIG. 3 is a sectioned perspective view of a portion of the engine housing shown in FIG. 2 to reveal structure for one fuel injector and engine cylinder.

Referring initially to FIGS. 1-3, a dual fuel engine 10 includes a dual fuel common rail system 20 mounted to an engine housing 11 that defines a plurality of engine cylinders 12. The dual fuel common rail system 20 includes exactly one fuel injector 25 positioned for direct injection into each of the plurality of engine cylinders 12. A gaseous fuel common rail 21 and a liquid fuel common rail 22 are fluidly connected to each fuel injector 25. The dual fuel common rail system 20 also includes gas supply and pressure control devices 16 as well as liquid supply and pressure control devices 17. Each of the fuel injectors 25, the gas pressure supply and control devices 16 and the liquid supply and pressure control devices 17 are controlled by an electronic engine controller 15 in a known manner. The gas supply and pressure control devices 16 may include a pressurized cryogenic liquid natural gas tank with an outlet fluidly connected to a variable delivery cryogenic pump. Devices 16 may also include a heat exchanger, an accumulator, a gas filter and a fuel conditioning module that controls the supply and pressure of gaseous fuel to gaseous fuel common rail 21. The liquid supply and pressure control devices 17 may include a diesel fuel tank, fuel filters and an electronically controlled high pressure fuel pump that supply liquid fuel to, and control pressure in, liquid fuel common rail 22.

As best shown in FIGS. 1 and 2, the blocks 31 of the co-axial quill assemblies 30 may be daisy-chained together with gaseous fuel line segments 18 and liquid fuel line segments 19 to define the gaseous fuel common rail 21 and the liquid fuel common rail 22, respectively. The last co-axial quill assembly 30 in the daisy-chain may have a set of plugs in place of the fittings shown in FIG. 2.

Figure 4:
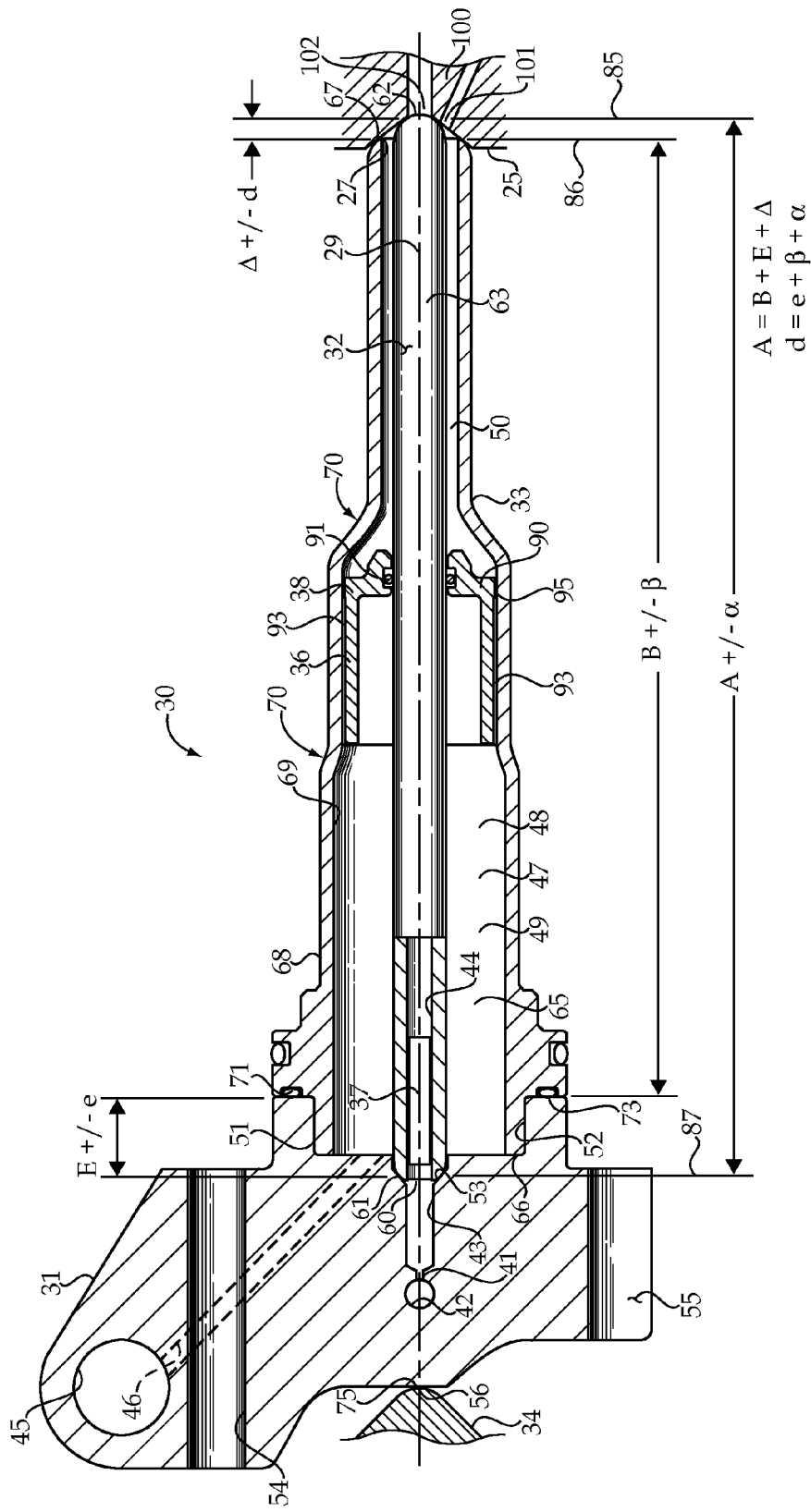
FIG. 4 is a sectioned side view through a co-axial quill assembly according to another aspect of the present disclosure.
Figure 5:
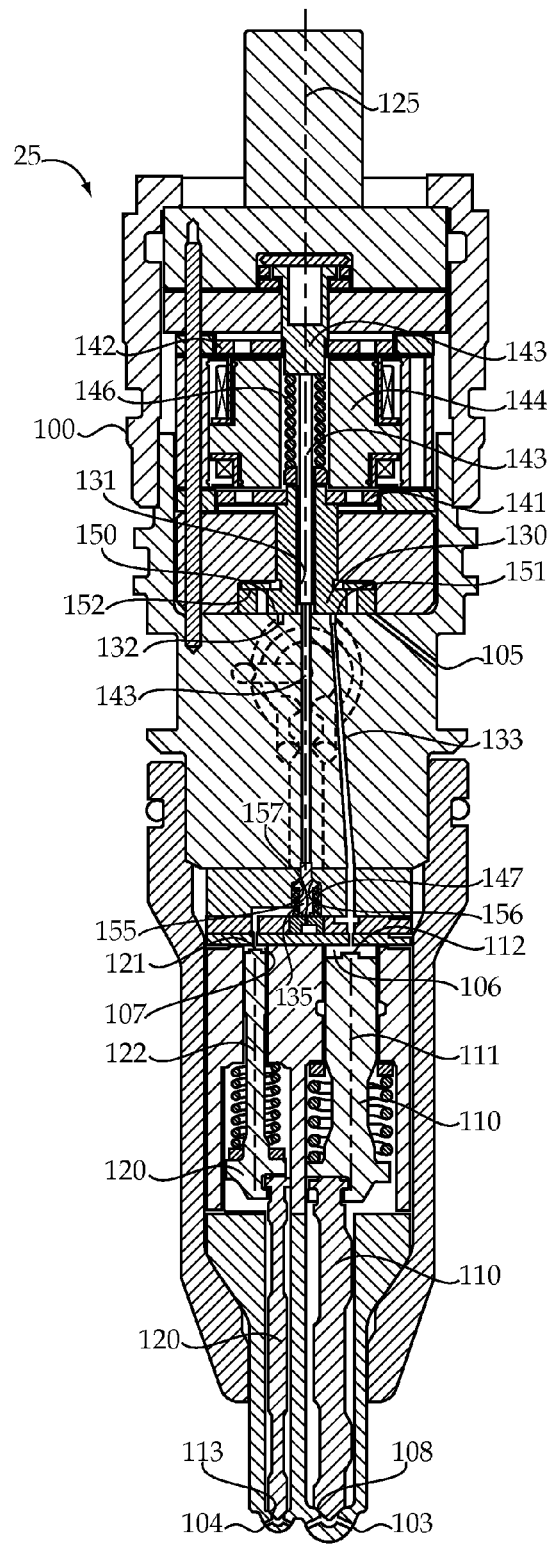
FIG. 5 is a sectioned front view of a fuel injector according to an aspect of the present disclosure.

Referring in addition to FIG. 4, the dual fuel common rail system 20 includes a co-axial quill assembly 30 with an inner quill 32 and an outer quill 33 in sealing contact with a common conical seat 27 of each fuel injector 25. In the illustrated embodiment, a pressure damping chamber 48 consists of an upstream segment 49 of the gaseous fuel conduit 47 that has a flow area at least several times larger than the downstream segment 50 of the gaseous fuel conduit 47. The pressure damping chamber 48 is defined in each co-axial quill assembly 30 in order to damp pressure waves moving from gaseous fuel common rail 21 toward the respective fuel injector 25, especially during an injection event. The pressure damping chamber 48 has a volume greater than a gaseous fuel volume 26 (nozzle chamber, sac and gas passageways) within the respective fuel injector 25. Those skilled in the art will appreciate that the available space constraints on fuel injector 25 limit the size of the gaseous fuel volume 26 within each fuel injector 25. The gas volume 26 in each fuel injector may likely be many times less than a rated gaseous injection volume from injector 25.

One strategy for sizing the pressure damping chamber 48 may start with the continuity equation, and then derive an equation for the pressure response of a particular fluid (e.g. natural gas) in a specific volume (the pressure damping chamber 48) to a flow rate arriving (from the rail 21) to a flow rate leaving the volume (injection rate). The idea is to reduce the pressure change reaction to the volume flow of the fluid to a satisfactory level. The pressure damping chamber 48 should provide sufficient absorption of arriving pressure waves to damp out reflective transients. Thus, one might consider a maximum rated volume of gaseous fuel delivery for fuel injector 25 in the engine 10, and the gas injection pressure, and size a volume of the pressure damping chamber 48 that will provide sufficient absorption of the pressure waves.

Referring again to FIGS. 2-4, each co-axial quill assembly 30 may include a load adjusting clamp 34 with a pivot surface 75 in contact with a block 31 at a load adjustment location 56 that is intersected by the axis 29 of the inner quill 32. The load adjusting clamp 34 may define a fastener slot 77 and a fastener bore 76 that receive a first fastener 81 and a second fastener 80, respectively. The load adjustment clamp 34 pivots on load adjustment location 56 responsive to adjustments to the first and second fasteners 81, 80. Fastener 80 may include a spherical washer and bolt, while fastener 81 may be a shoulder bolt that is utilized to set an attitude of load adjustment clamp 34. For instance, the proper assembly may require connection of co-axial quill assembly 30 to engine housing 11 with first fastener 81. Bolt 80 can then be tightened to a pre-determined torque that assures proper seating seal contact between outer quill 33 and inner quill 32, independently but simultaneously, on common conical seat 27 of fuel injector 25. During this process, load adjustment clamp 34 will pivot through some limited small angle. The fasteners 80 and 81 are received in fastener bore 54 and fastener slot 55, respectively of blocks 31.

Each block 31 of each co-axial quill assembly 30 defines a gaseous rail passage 45 that is oriented perpendicular to the axis 29 of inner quill 32 and fluidly connected to a gaseous fuel passage 46 that opens at one end into a quill chamber 52 outside of conical seat 53. The gaseous rail passage 45 may extend completely through block 31 in order to facilitate the daisy chain connection structure shown in FIGS. 1 and 2. Each block 31 also includes a liquid rail passage 42, which may extend all the way through, and that is oriented perpendicular to the axis 29 and fluidly connected to a liquid fuel passage 43 that opens on one end into quill chamber 52 through conical seat 53. A segment of liquid fuel passage 43 may have an orifice segment 41, as shown, to reduce a flow rate from the liquid rail 22 to help manage transients in the liquid quill 32. The minimum area required for the orifice 41 may be computed by dividing the total injection quantity by the injection duration, and sizing the orifice to allow that delivery with a minimum pressure drop. Thus, the sizing of that flow area may relate to the performance characteristics of fuel injector 25. The inner quill 32 defines a liquid fuel conduit 44 extending between a first end 60 and a second end 62. First end 60 includes an annular spherical surface 61 that rests in contact at a gage line 87 with, but remains unattached to, the conical seat 53, and a gage line 85 on an annular spherical surface at second end 62 in contact with common conical seat 27 of fuel injector 25. The outer quill 33 has a hollow interior 65 separating a first end 66 from a second end 67. The first end 66 is received in the quill chamber 52, and the outer quill 33 may be attached to block 31 with mating threads 51.

Practical manufacturing limitations may forbid mass production of co-axial quill assemblies 30 in which either the inner quill 32 or the outer quill 33 are integrally formed with block 31, or each other. Thus, an annular seal 71 serves to seal against leakage of gaseous fuel from between block 31 and outer quill 33 of co-axial quill assembly 30. In this embodiment, annular seal 71 includes an o-ring 73 in a face seal configuration trapped between block 31 and outer quill 33. In the illustrated construction, the inner quill 32 is out of contact with the outer quill 33 in each co-axial quill assembly 30. A gaseous fuel conduit 47 is fluidly connected to gaseous fuel passage 46, and also extends between outer surface 63 of inner quill 32 and the inner surface 69 of outer quill 33. Spatial constraints in engine housing 11 may require that an upstream half 49 of the gaseous fuel conduit 47 have a pressure damping chamber 48 with a volume larger than a volume of a downstream half 50 of the gaseous fuel conduit 47. Thus, a majority of the volume of the pressure damping chamber 48 may be located in an upstream half 49 of the gaseous fuel conduit 47 both within outer quill 33 and within quill chamber 52. As stated earlier, the pressure damping chamber 48 should be of sufficient size and shape to damp pressure waves arriving from the gaseous fuel passage 46 in order to reduce variations in gaseous fuel injection rates and quantities. In this specific example, the available space in engine housing 11 may permit the relatively uniform wall thickness of the outer quill 33, which is defined between an inner surface 69 and outer surface 68, to include two step wise diameter reductions 70 along the axis 29 in a direction of second end 67. Nevertheless, other engine housing geometries may vary substantially from that shown. The gaseous rail passage 45 of each block 31 may define a portion of the gaseous fuel common rail 21. Likewise, the liquid rail passage 42 of each block 31 may define a segment of the liquid fuel common rail 22 as best shown in FIGS. 1 and 2.

Referring more specifically to FIG. 4, reliable sealing contact between the co-axial quill assembly 30 and fuel injector 25 against leakage of both gaseous and liquid fuels may be accomplished by tightening only a single fastener 80 to a predetermined torque load. This may be accomplished by locating the gage line 85 at the second end 62 of the inner quill 32 to extend a predetermined target distance Δ beyond the gage line 86 at the second end 67 of the outer quill 33. The gage line 85, 86 is the sealing contact line. A predetermined load may be placed on block 31 by load adjusting clamp 34 acting along axis 29 so that the outer and inner quills 33, 32 seat and sealingly engage on common conical seat 27 at their respective gage lines 85, 86. Tightly controlling the predetermined target distance Δ may be accomplished in a number of ways. In the illustrated embodiment, target distance Δ is held to a tolerance d that is a stack up of tolerance e, β and α. Dimension distance E+/−tolerance e corresponds to the distance between the gage line of conical seat 53 and the shoulder face against which o-ring 73 seals on block 31. Dimension distance B+/−tolerance β corresponds to the distance from the shoulder surface of outer quill 33 to the gage line 86 at second end 67 of outer quill 33. Dimension distance A+/−tolerance α corresponds to the distance between the gage lines 87, 85 at opposite ends of inner quill 32. Provided that the distances A, B and E can be held within reasonable tolerances, the tolerance stack up d on target distance Δ can be made acceptable such that proper sealing at conical seat 27 of fuel injector 25 is reliably made. Tolerance stack up d equals e plus β plus α. During preassembly, the predetermined target distance Δ may be set within an acceptable tolerance d by selecting a block 31 with an appropriate dimension distance E+/−e, an outer quill 33 with an appropriate dimension distance B+/−β, and a inner quill 32 with an appropriate dimension distance A+/−α. Provided that the tolerance stack up of e+β+α yields an acceptable tolerance d, simple nearly fool proof installation may be assured by simply tightening a single fastener 80 to an appropriate torque load to apply an appropriate load along centerline 29.

Those skilled in the art will appreciate that the inner and outer quills 32, 33 may have different spring rates and may require different load levels to ensure proper sealing at common conical seat 27. Therefore, some differential length, which may be positive, negative or zero, depending upon the specific design, quill materials and geometries may need to be added to the above described dimensions in order to ensure proper sealing contact at fuel injector 25.

In order to trap debris often liberated into the fuel flows during the first time operation of engine 10 after being built, co-axial quill assembly 30 may include a gaseous fuel edge filter 36 and a liquid fuel edge filter 37. In the illustrated embodiment, liquid fuel edge filter 37 may be positioned in the liquid fuel conduit 44 defined by inner quill 32. The gaseous fuel edge filter 36 is shown positioned within outer quill 33 between the two step wise diameter reductions 70. In the illustrated embodiment, gaseous fuel edge filer 36 may have a combined dual purpose by including a retainer 38 that can be thought of as in contact with the inner surface 69 of outer quill 33 and of the outer surface 63 of inner quill 32. In this embodiment, retainer 38 may include an o-ring 91 that encourages gaseous fuel traveling along gaseous fuel conduit 47 to move through filter passages 93 between edge filter 36 and outer quill 33 to trap debris upstream from fuel injector 25. The outer surface of retainer 38 includes a plurality of filter passages 93 that are distributed around, and oriented perpendicular to the axis 29. In this embodiment, retainer 38 may comprise a suitable metallic piece, such as steel, that is machined to the shape as shown and also includes an o-ring 91 that grips the outer surface 63 of inner quill 32. Retainer 38 may be connected to the outer quill 33 with a metal to metal interference fit 95.

Because inner quill 32 is unattached to either outer quill 33 or block 31, co-axial quill assembly 30 may include the retainer 38 that is in contact with the outer surface 63 to maintain the inner quill 32 with the block 31 and outer quill 33 during pre-installation handling. In other words, retainer 38 may inhibit inner quill 32 from falling out of outer quill 33 during pre-installation handling. The edge filter 36/retainer 38 of the disclosure allows the co-axial quill assemblies 30 to be preassembled with a precisely predetermined target distance Δ so that installation is made easy and simple without the need for custom adjustments at each co-axial quill assembly 30. In the illustrated embodiment, consistent leak free installation may only require torquing fastener 80 to a predetermined load, without any other considerations.

Referring in addition to FIGS. 5-9, a fuel injector 25 according to the present disclosure includes an injector body 100 that defines a first nozzle outlet set 103, a second nozzle outlet set 104 and a drain outlet 105. Injector body also defines a first fuel inlet 101 and a second fuel inlet 102 that can be seen in the sectioned view of FIG. 4 opening through the common conical seat 27 of fuel injector 25. Disposed within injector body 100 are a first control chamber 106 and a second control chamber 107. A first check valve member 110 has a closing hydraulic surface 112 exposed to fluid pressure in the first control chamber 106. The first check valve member 110 is movable between a closed position, as shown, in contact with a first seat 108 to fluidly block the first fuel inlet 101 to the first nozzle outlet set 103, and an open position out of contact with the first seat 108 to fluidly connect the first fuel inlet 101 to the first nozzle outlet set 103 via a passage not visible in the sectioned view of FIG. 5. A second check valve member 120 has a closing hydraulic surface 121 exposed to fluid pressure in the second control chamber 107. The second check valve member 120 is movable between a closed position, as shown, in contact with a second seat 113 to fluidly block the second fuel inlet 102 to the second nozzle outlet set 104, and an open position out of contact with the second seat 113 to fluidly connect the second fuel inlet 102 to the second nozzle outlet set 104 via a passage not visible in the sectioned view of FIG. 5. Thus, injection of a first fuel through first nozzle outlet set 103 is facilitated by movement of first check valve member 110, while injection of a second fuel through second nozzle outlet set 104 is facilitated by movement of the second check valve member 120. Those skilled in the art will appreciate that the first and second nozzle outlet sets 103, 104 might be expected to each include six nozzle outlet sets that are arranged around respective centerlines in a manner well known in the art. However, nozzle outlet sets 103 and 104 could each include as few as one nozzle outlet or any number of nozzle outlets in any arrangement without departing from the present disclosure.

A first control valve member 130 is positioned in injector body 100 and is movable along a common centerline 125 between a first position at which the first control chamber 106 is fluidly blocked from the drain outlet 105, and a second position at which the first control chamber 106 is fluidly connected to the drain outlet 105 via a drain passage 200. When first control chamber 106 is fluidly connected to drain outlet 105, pressure in first control chamber 106 drops, relieving pressure on closing hydraulic surface 112 to allow first check valve member 110 to lift to facilitate an injection of the first fuel (e.g. natural gas) through first nozzle outlet set 103. A second control valve member 135 is positioned in the injector body 100 and movable along the common centerline 125 between a first position at which the second control chamber 107 is fluidly blocked from the drain outlet 105, and a second position at which the second control chamber 107 is fluidly connected to the drain outlet 105 via a drain passage 202. When second control chamber 107 is fluidly connected to drain outlet 105, fluid pressure acting on closing hydraulic surface 121 is relieved to allow second check valve member 120 to lift to an open position to facilitate injection of the second fuel (e.g. liquid diesel) through the second nozzle outlet set 104. In the illustrated embodiment, the second control valve member 135 is intersected by the common centerline 125, but the first control valve member 130 defines a bore 131 therethrough that is concentric with common centerline 125. In the illustrated fuel injector 25, the respective control valve members 130, 135 may be moved to their respective second positions with first and second electrical actuators, respectively. In particular, a first armature 141 is operably coupled to move the first control valve member 130, and a second armature 142 is operably coupled to move the second control valve member 135 by way of a plurality of pushers 143. A shared stator 144 separates the first armature 141 from the second armature 142. First control valve member 130 is biased toward its first position to block first control chamber 106 from drain outlet 105 by spring 146. First and second armatures 141, 142 are also biased toward their initial respective initial air gap positions by spring 146. A second spring 147 biases the second control valve member 135 to its first position at which the second control chamber 106 is fluidly blocked from drain outlet 105.

Figure 6:
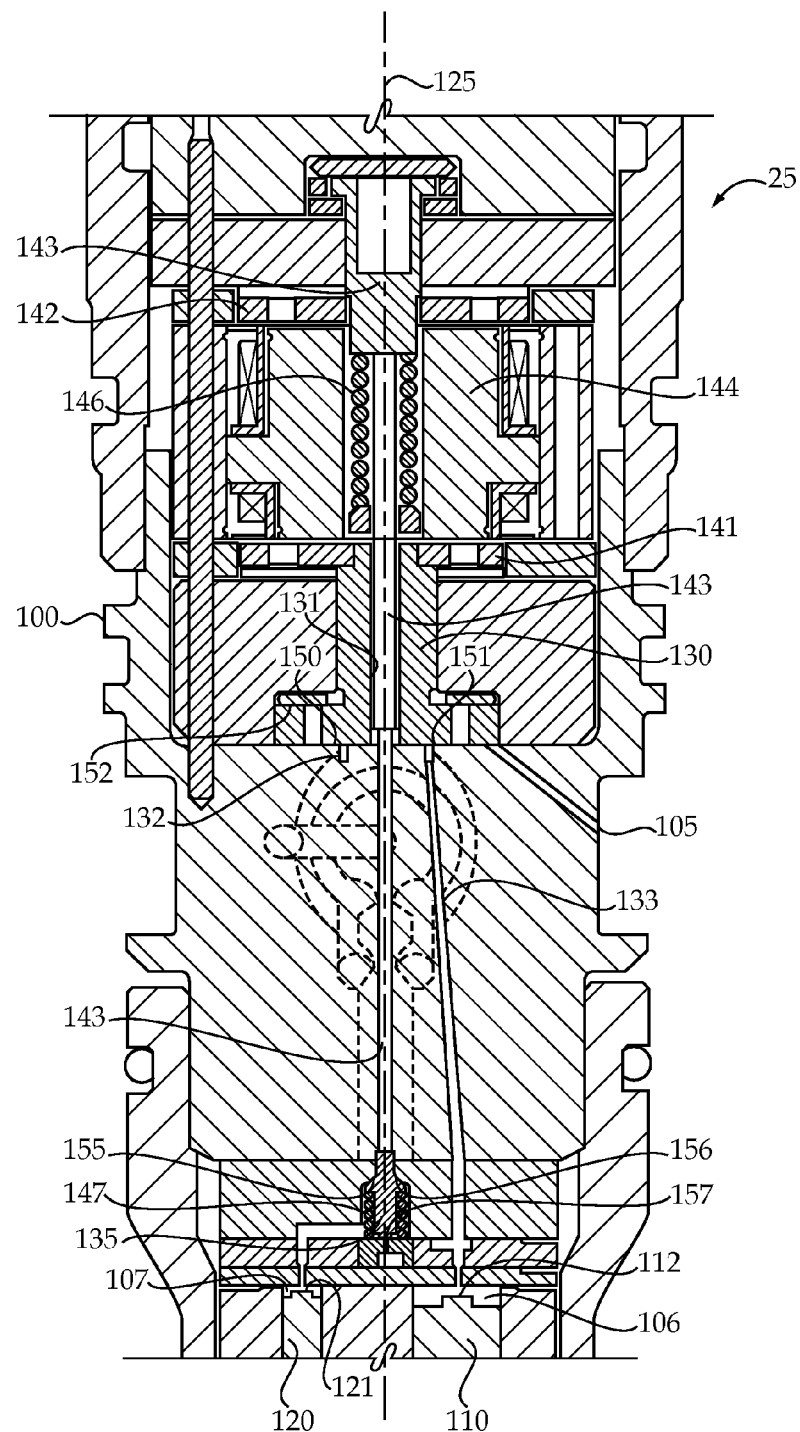
FIG. 6 is an enlarged sectioned front view of the control valve portion of the fuel injector shown in FIG. 5.
Figure 7:
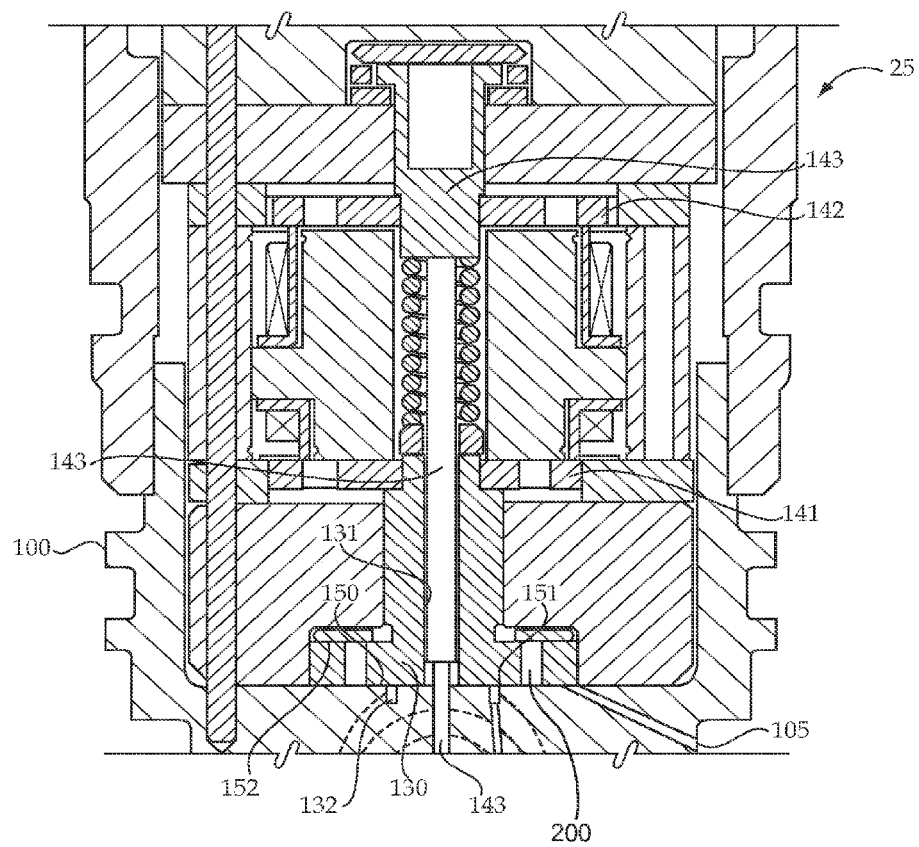
FIG. 7 is still another enlargement of a sectioned front view of a portion of the fuel injector of FIG. 5.
Figure 8:
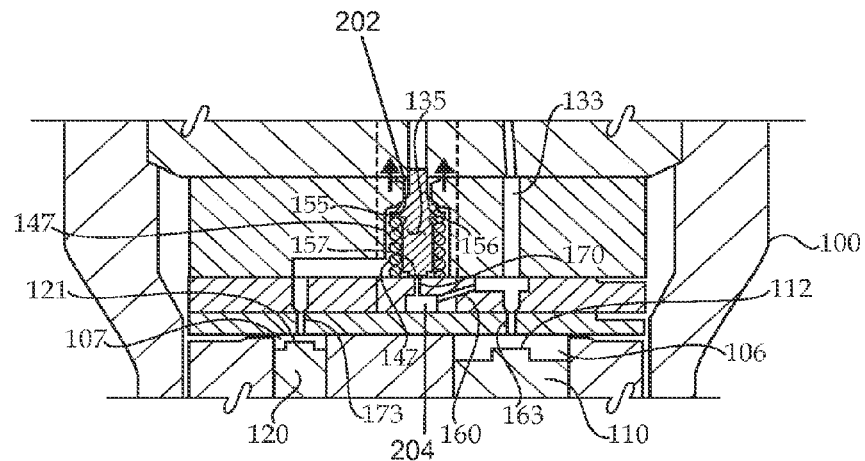
FIG. 8 is partial enlarged sectioned view of the control chamber portion of the fuel injector of FIG. 5.
Figure 9:
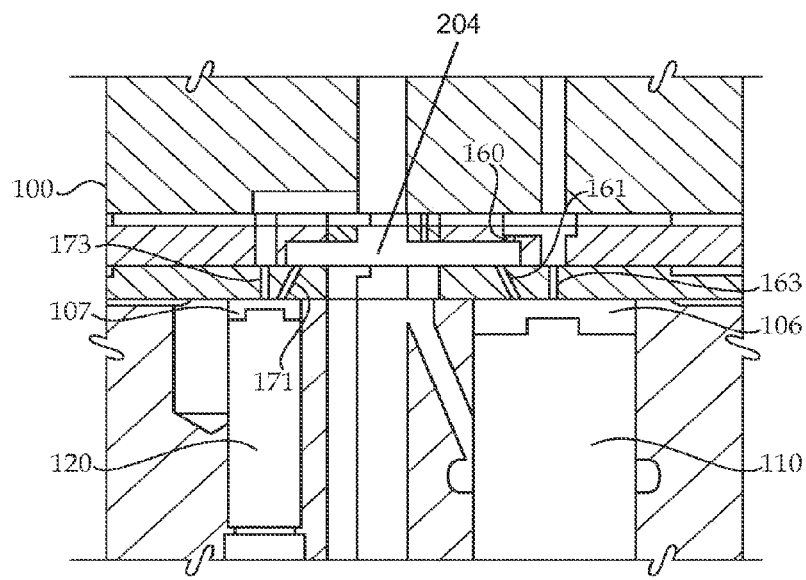
FIG. 9 is an enlarged sectioned front view similar to FIG. 8 except through a different section of the fuel injector of FIG. 5.

Referring now more specifically to the enlarged views of FIGS. 6 and 7, the first control valve member 130 is in contact and out of contact with a first valve seat 150 at the first position and the second position, respectively. Likewise, the second control valve member 135 is in contact and out of contact with a second valve seat 155 at its first position and second position, respectively. In the illustrated embodiment, one of the first valve seat 150 and second valve seat 155 is a flat seat 151, and the other is a conical seat 156. In the illustrated embodiment, first valve seat 150 has the flat seat 151, and the second valve seat 155 is a conical seat 156. However, those skilled in the art will appreciate that the plumbing of fuel injector 25 could be reversed without departing from the present disclosure. As best shown in FIG. 7, first control valve member 130 may be attached to move with first armature 141 responsive to energizing and de-energizing the lower coil mounted in common stator 144. In particular, first control valve member 130 may be trapped to move between flat seat 151 and a stop 152. In the illustrated embodiment, first control chamber 106 is fluidly connected to flat seat 151 by a control passage 133. Although not necessary, control passage 133 may open through flat seat 151 via an annular groove 132, in order to provide a large flow area and balance to the flow when first control chamber 106 is fluidly connected to drain outlet 105. In the illustrated embodiment, the first control chamber 106 is always fluidly connected to the high pressure in the second fuel inlet 102 via an F orifice 160 and a Z orifice 161. The upstream ends of respective F and Z orifices 160 and 161 are fluidly connected to the fuel inlet passage 204 (see FIGS. 8 and 9), which is fluidly connected to the second fuel inlet 102 via passages not visible in the sectioned views. However, that fluid connection is always unobstructed. The first control chamber 106 is fluidly connected to the control passage 133 via a so called A orifice 163. Thus, when first control valve member 130 lifts off of flat seat 151, first control chamber 106 becomes fluidly connected to drain outlet 105 via A orifice 163, control passage 133 and annular groove 132. During this time, the high pressure in second fuel inlet 102 will also be directly fluidly connected to drain outlet 105 via both the Z orifice 161 and the F orifice 160. However, the connection to drain outlet 105 is sufficient to lower pressure in control chamber 106 to allow the first check valve member 110 to lift and open to commence an injection event. When first control valve member 130 is moved downward to close flat seat 151, the parallel fluid connections to high pressure second fuel inlet 102 facilitated by F orifice 160 and Z orifice 161 allow pressure to quickly build in control chamber 106 to abruptly end the injection event.

Second control valve member 135 may be trapped to move between conical seat 156 and another flat seat 157. Second control chamber 107 may also be fluidly connected to the high pressure of second fuel inlet 102 via its own F orifice 170 and Z orifice 171, whose upstream ends are fluidly connected to the fuel inlet passage 204, which is fluidly connected to the second fuel inlet 102 via passages not visible in the sectioned views. When the upper coil is energized, second armature 142 will move downward with pushers 143 to move second control valve member 135 out of contact with conical seat 156 to fluidly connect second control chamber 107 to drain outlet 105 via A orifice 173, past conical seat 156 to a drain passage 202, and then to drain outlet 105 via a fluid connection not visible in the sectioned views. When this occurs, control valve member 135 also moves downward into contact with flat seat 157 to block F orifice 170 to hasten the drop and pressure in control chamber 107 to more quickly facilitate upward movement of second check valve member 120 to commence an injection event. When the upper coil is de-energized, armature 142 moves upward under the action of spring 146, and control valve member 135 moves upward to close conical seat 156 under the action of the second spring 147. When this occurs, high pressure quickly returns to control chamber 107 via the now open fluid connection facilitated by F orifice 170 and the separate Z orifice 171, to quickly hasten the downward movement of second check valve member 120 to end the injection event. As in the first check valve member 110, the F and Z orifices 170, 171 are fluidly in parallel with each other. Thus, the second check valve member 135 is trapped to move between conical seat 156 and flat seat 157. Reiterating, the first control chamber 106 is fluidly connected to the second fuel inlet 102 through two orifices 160, 161 (F orifice and a Z orifice) that are fluidly in parallel when the first control valve member 130 is at either its first position or its second position. Each of the first control chamber 106 and second control chamber 107 is fluidly connected to the second fuel inlet 102 when the first control valve member 130 and the second control valve member 135 are in the respective first positions and when in the respective second positions.

In the illustrated embodiment, the first check valve member 110 and the second check valve member 120 move along respective lines 111 and 122 that are each parallel to, but spaced apart from common centerline 125. Nevertheless, those skilled in the art will appreciate that the structure could be different. For instance, dual concentric check valve members that were concentric with common centerline 125 would also fall within the scope of the present disclosure.

Although pressure in the respective control chamber 106 and 107 could be controlled in a known manner using either a two way or a three way valve of a type previously described in the art, the present disclosure also contemplates a more advanced pressure control strategy that utilizes so called F, A and Z orifices to improve performance both in opening and closing the respective check valve members 110 and 120.

The inner quill 32 and the outer quill 33 of each co-axial quill assembly 30 may be matched pair such that a gage line 85 at an end 62 of inner quill 32 extends a pre-determined target distance A beyond a gage line 86 at the end 67 of outer quill 33. This ensures that the inner and outer quills 32, 33 seat on common conical seat 27 responsive to a pre-determined load on co-axial quill assembly 30 along axis 29. Thus, each co-axial quill assembly may be interchangeable with any other co-axial quill assembly in engine 10. However, one could expect that at least one outer quill 33 of one co-axial quill assembly 30 will not match the inner quill 32 of an other co-axial quill assembly 30 in engine 10. Thus, the co-axial quill assemblies are best pre-assembled prior to installation of the fuel system 20 into engine 10. The preassembled co-axial quill assemblies 30 are retained together during pre-installation handling by a retainer 38. The retainer 38 should resist the separation of the inner quill 32 from its matched outer quill 33 absent a forced disassembly during pre-installation handling. However, the retainer 38 may permit some relative movement along axis 29 between outer quill 33 and inner quill 32 such as what might occur during installation of fuel system 20 to engine 10. After installation, the retainers 38 are left in place and may be inert to operation of the fuel system 11. Forced disassembly means that the matched quill pair 32, 33, will not accidently separate, such as by being dropped or maybe even mishandled. The forced disassembly requires an intent and may be a tool(s) to separate one of the inner quill 32 and outer quill 33 from retainer 38. Being inert to operation of fuel system 20 means that fuel flows through or past retainer 38 without interfering with the flow to fuel injectors 25, even though the retainer may include an edge filter 36 for capturing liberated debris from fuel flow.

INDUSTRIAL APPLICABILITY

The present disclosure applies broadly to any engine that utilizes two fluidly distinct common rails to deliver fuel to a single fuel injector associated with each engine cylinder. The contents of the respective common rails may differ in at least one of pressure, chemical identity and matter phase without departing from the present disclosure. In the illustrated example, the respective common rails may differ in all three by containing pressurized natural gas and liquid diesel fuel, respectively at different pressures. The present disclosure finds specific application where proper sealing engagement of the inner and outer quills 32, 33 with the common conical seat 27 of each fuel injector 25 requires matched pairs of inner and outer quills that need to be retained together during pre-installation handling with a retainer 38.

Referring back to all of the FIGS. 1-9, a method of operating dual fuel engine 10 begins by assembling a dual fuel common rail system 20 to an engine housing 11. Gaseous fuel is supplied from the gaseous fuel common rail 21 to each of the plurality of fuel injectors 25 by a respective co-axial quill assembly 30. Likewise, liquid fuel from a liquid fuel common rail 22 is supplied to each of the plurality of fuel injectors 25 by the same respective co-axial quill assemblies 30. When in operation, gaseous fuel is injected from each fuel injector 25 into an engine cylinder 12 responsive to a gaseous fuel injection signal communicated from electronic engine controller 15 to the fuel injector 25. In particular, a gaseous fuel injection event is initiated by energizing the lower electrical actuator (lower coil) to move armature 141 and first control valve member 130 upward out of contact with flat seat 151. This fluidly connects control chamber 106 to drain outlet 105 to reduce pressure acting on closing hydraulic surface 112. The gaseous fuel check valve 110 then lifts out of contact with seat 108 to commence spray of gaseous fuel out of first nozzle outlet set 103. The injection event is ended by de-energizing the lower electrical actuator to allow armature 141 and control valve member 130 to move downward under the action of spring 146 to back into contact to close flat seat 151. When this occurs, pressure abruptly rises and control chamber 106 acting on closing hydraulic surface 112 to push check valve member 110 back downward into contact with seat 108 to end the gaseous fuel injection event. Also, liquid fuel from the fuel injector 25 is injected directly into engine cylinder 12 from the same fuel injector 25 responsive to a liquid fuel injection signal from electronic engine controller 15. In particular, a liquid fuel injection event is initiated by energizing the upper electrical actuator to move armature 142 downward along common centerline 125. This causes pushers 143 to move second control valve member 135 out of contact with conical seat 156. This in turn relieves pressure in control chamber 107 allowing check valve member 120 to lift out of contact with seat 113 to commence a liquid fuel injection event out of nozzle outlet set 104. To end the injection event, the upper electrical actuator (upper coil) is de-energized. When this is done, spring 146 pushes armature 142 upward while spring 147 pushes second control valve member 135 back up into contact with conical seat 156 to close the fluid connection between control chamber 107 and drain outlet 105. When this is done, pressure acting on closing hydraulic surface 121 quickly rises causing check valve member 120 to move downward and back into contact with seat 113 to end the liquid fuel injection event. Both liquid and natural gas injection events are ended by fluidly connecting the respective control chambers 107, 106 to the liquid fuel common rail 22 through respective F orifices 160, 170, and Z orifices 161, 171 that are fluidly in parallel.

Variations in gas fuel injection quantities among the plurality of fuel injectors 25 may be reduced by damping pressure waves arriving from the gaseous fuel common rail 21 with a pressure damping chamber 48 defined by each respective co-axial quill assembly 30. During gaseous fuel injections, gaseous fuel arrives in quill chamber 52 from gaseous fuel passage 46. The gaseous fuel then flows in grooves of edge filter 36 with debris being trapped between the outer surface of edge filter 36 and the inner surface 69 of outer quill 33. This flow pattern may be encouraged by having mating geometry that encourages the sealing contact between retainer 38 and the various other components including inner quill 32, edge filter 36 and block 31. During the pre-assembly of each co-axial quill assembly 30, the predetermined target distance Δ is set as discussed earlier. One of the discussed strategies (e.g. o-ring, elevated seal lands, cone on cone or annular weld) may be utilized for sealing against leakage of gaseous fuel from between the outer quill 33 and the block 31.

During installation, the inner quill 32 may be clamped between the conical seat 53 of block 31 and the common conical seat 27 of the respective fuel injector 25. By utilizing blocks 31 for each co-axial quill assembly and by orienting them appropriately as described, dual fuel common rail system 20 facilitates construction of gaseous fuel common rail 21 and the liquid fuel common rail 22 by daisy chaining a plurality of co-axial quill assemblies 30 together utilizing identical gaseous fuel line segments 18, liquid fuel line segments 19 and associated fittings received in respective gaseous rail passages 45 and liquid rail passages 42. Both the pre-installation construction and the installation configuration shown serve to maintain the inner quill 32 of each co-axial quill assembly 30 out of contact with the respective outer quill 33.

The present disclosure addresses a previously unrecognized problem associated with undesirable, and maybe unpredictable, variations in gaseous fuel injection rates and quantities due to pressure fluctuations within the fuel injector 25 during gaseous fuel injection events. The present disclosure insightfully recognizes that a small flow area orifice in the liquid fuel supply inhibits the pressure fluctuations in the associated liquid fuel injection variations, whereas an enlarged volume pressure damping chamber 48 serves a similar purpose in reducing pressure fluctuations during gaseous fuel injection events within the respective fuel injectors 25.

Prior to assembling the fuel system 20, a plurality of quill assemblies 30 are preassembled to include a block 31, and inner quill 32 and an outer quill 33. During preassembly, dimensions are checked in order to match an inner quill 32 with an outer quill 33 of each quill assembly 30 such that the gage line 85 at an end of inner quill 32 extends a predetermined target distance Δ beyond a gage line 86 at the end of outer quill 33. This ensures that the inner and outer quills 32, 33 will seat and seal on the common conical seat 27 responsive to a predetermined load on co-axial quill assembly 30 along axis 29. After being matched, the inner and outer quills 32, 33 may be retained together during pre-installation handling with a retainer 38 positioned between the inner and outer quills 32, 33. Although not a necessity, the retainer 38 may also serve to keep the inner quill 32 and the outer quill 33 out of contact with one another. After the fuel system 20 is installed, the retainers 38 are left in place but are preferably inert to the operation of engine 10.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A fuel injector comprising:
    an injector body defining a first fuel inlet, a second fuel inlet, a first nozzle outlet set, a second nozzle outlet set, a first drain passage, and a second drain passage, and defining therein a first control chamber and a second control chamber;
    a first check valve member with a closing hydraulic surface exposed to fluid pressure in the first control chamber, and being movable between a closed position in contact with a first seat to fluidly block the first fuel inlet from the first nozzle outlet set, and an open position out of contact with the first seat to fluidly connect the first fuel inlet to the first nozzle outlet set;
    a second check valve member with a closing hydraulic surface exposed to fluid pressure in the second control chamber, and being movable between a closed position in contact with a second seat to fluidly block the second fuel inlet from the second nozzle outlet set, and an open position out of contact with the second seat to fluidly connect the second fuel inlet to the second nozzle outlet set;
    a first control valve member positioned in the injector body and being movable along a common centerline between a first position at which the first control chamber is fluidly blocked from the first drain passage, and a second position at which the first control chamber is fluidly connected to the first drain passage; and
    a second control valve member positioned in the injector body and being movable along the common centerline between a first position at which the second control chamber is fluidly blocked from the second drain passage, and a second position at which the second control chamber is fluidly connected to the second drain passage,
    an axis of the first control valve member being coaxial with an axis of the second control valve member.

2. The fuel injector of claim 1 wherein one of the first control valve member and the second control valve member is intersected by the common centerline, and
    an other of the first control valve member and the second control valve member defines a bore therethrough that is concentric with the common centerline.

3. The fuel injector of claim 1 further comprising:
    a first armature operably coupled to move the first control valve member;
    a second armature operably coupled to move the second control valve member; and
    a shared stator separating the first armature from the second armature.

4. The fuel injector of claim 1 wherein the first control valve member is in contact and out of contact with a first valve seat at the first position and the second position, respectively,
    the second control valve member is in contact and out of contact with a second valve seat at the first position and the second position, respectively, and
    one of the first valve seat and the second valve seat is a flat seat.

5. The fuel injector of claim 4 wherein an other of the first valve seat and the second valve seat is a conical seat.

6. The fuel injector of claim 1 wherein the second control valve member is trapped to move between a conical seat and a second flat seat, and
    the first control valve member is trapped to move between a first flat seat and a stop.

7. The fuel injector of claim 1 wherein the first check valve member and the second check valve member move along a first line and a second line, respectively, that are each parallel to, but spaced apart from, the common centerline.

8. The fuel injector of claim 1 wherein the first control chamber is fluidly connected to one of the first fuel inlet and the second fuel inlet through two orifices that are fluidly in parallel when the first control valve member is in the first position, such that the two orifices share a common fluid inlet and a common fluid outlet when the first control valve member is in the first position.

9. The fuel injector of claim 1 wherein each of the first control chamber and the second control chamber is fluidly connected to one of the first fuel inlet and the second fuel inlet when the first control valve member and the second control valve member are in the respective first positions.

10. A fuel system comprising:
    a plurality of fuel injectors, each fuel injector of the plurality of fuel injectors including
        an injector body defining a first fuel inlet, a second fuel inlet, a first nozzle outlet set, a second nozzle outlet set, a first drain passage, and a second drain passage, and defining therein a first control chamber and a second control chamber;
        a first check valve member with a closing hydraulic surface exposed to fluid pressure in the first control chamber, and being movable between a closed position in contact with a first seat to fluidly block the first fuel inlet from the first nozzle outlet set, and an open position out of contact with the first seat to fluidly connect the first fuel inlet to the first nozzle outlet set;
        a second check valve member with a closing hydraulic surface exposed to fluid pressure in the second control chamber, and being movable between a closed position in contact with a second seat to fluidly block the second fuel inlet from the second nozzle outlet set, and an open position out of contact with the second seat to fluidly connect the second fuel inlet to the second nozzle outlet set;
        a first control valve member positioned in the injector body and being movable along a common centerline between a first position at which the first control chamber is fluidly blocked from the first drain passage, and a second position at which the first control chamber is fluidly connected to the first drain passage;
        a second control valve member positioned in the injector body and being movable along the common centerline between a first position at which the second control chamber is fluidly blocked from the second drain passage, and a second position at which the second control chamber is fluidly connected to the second drain passage;
a source of a first fuel fluidly connected to the first fuel inlet;
a source of a second fuel fluidly connected to the second fuel inlet; and
an electronic controller in control communication with each fuel injector of the plurality of fuel injectors,
the first fuel differing from the second fuel in at least one of chemical identity, matter phase, and pressure, and
an axis of the first control valve member being coaxial with an axis of the second control valve member.

11. The fuel system of claim 10 wherein the source of the first fuel includes a first common rail, and the source of the second fuel includes a second common rail.

12. The fuel system of claim 11 wherein the first fuel is natural gas,
the second fuel is liquid diesel fuel,
the first common rail is at a first pressure, and
the second common rail is at a second pressure that is greater than the first pressure.

13. The fuel system of claim 12 wherein the injector body of each fuel injector includes a common conical seat through which the first fuel inlet and the second fuel inlet open.

14. The fuel system of claim 13 wherein one of the first control valve member and the second control valve member is intersected by the common centerline, and
an other of the first control valve member and the second control valve member defines a bore therethrough that is concentric with the common centerline.

15. The fuel system of claim 14 wherein each fuel injector includes a first armature operably coupled to move the first control valve member, a second armature operably coupled to move the second control valve member, and a shared stator separating the first armature from the second armature,
wherein the first check valve member and the second check valve member of each fuel injector move along a first line and a second line, respectively, that are each parallel to, but spaced apart from, the common centerline, and
wherein the first control chamber of each fuel injector is fluidly connected to one of the first fuel inlet and the second fuel inlet through two orifices that are fluidly in parallel when the first control valve member is in the first position, such that the two orifices share a common fluid inlet and a common fluid outlet when the first control valve member is in the first position.

16. A method for operating a fuel system that has a plurality of fuel injectors, each fuel injector of the plurality of fuel injectors including
an injector body defining a first fuel inlet, a second fuel inlet, a first nozzle outlet set, a second nozzle outlet set, a first drain passage, and a second drain passage, and defining therein a first control chamber and a second control chamber;
a first check valve member with a closing hydraulic surface exposed to fluid pressure in the first control chamber, and being movable between a closed position in contact with a first seat to fluidly block the first fuel inlet from the first nozzle outlet set, and an open position out of contact with the first seat to fluidly connect the first fuel inlet to the first nozzle outlet set;
a second check valve member with a closing hydraulic surface exposed to fluid pressure in the second control chamber, and being movable between a closed position in contact with a second seat to fluidly block the second fuel inlet from the second nozzle outlet set, and an open position out of contact with the second seat to fluidly connect the second fuel inlet to the second nozzle outlet set;
a first control valve member positioned in the injector body and being movable along a common centerline between a first position at which the first control chamber is fluidly blocked from the first drain passage, and a second position at which the first control chamber is fluidly connected to the first drain passage; and
a second control valve member positioned in the injector body and being movable along the common centerline between a first position at which the second control chamber is fluidly blocked from the second drain passage, and a second position at which the second control chamber is fluidly connected to the second drain passage,
an axis of the first control valve member being coaxial with an axis of the second control valve member,
the method comprising the steps of:
injecting a first fuel from the first nozzle outlet set by moving the first control valve member from the first position to the second position along the common centerline; and
injecting a second fuel from the second nozzle outlet set by moving the second control valve member from the first position to the second position along the common centerline.

17. The method of claim 16 wherein the first fuel is natural gas and the second fuel is liquid diesel fuel.

18. The method of claim 17 further comprising:
supplying the natural gas to the first fuel inlet of the fuel injectors from a gaseous fuel common rail; and
supplying liquid diesel fuel to the second fuel inlet of the fuel injectors from a liquid fuel common rail.

19. The method of claim 18 further comprising:
ending a natural gas injection event by moving the first control valve member into contact with a flat seat; and
ending a liquid diesel injection event by moving the second control valve member into contact with a conical seat.

20. The method of claim 19 wherein the step of ending the natural gas injection event includes fluidly connecting the first control chamber to the liquid fuel common rail through a first F orifice and a first Z orifice that are fluidly in parallel, such that the first F orifice and the first Z orifice share a first common fluid inlet and first common fluid outlet; and
the step of ending the liquid diesel injection event includes fluidly connecting the second control chamber to the liquid fuel common rail through a second F orifice and a second Z orifice that are fluidly in parallel, such that the second F orifice and the second Z orifice share a second common fluid inlet and a second common fluid outlet.

* * * * *